US011248081B2

(12) United States Patent
Singh et al.

(10) Patent No.: US 11,248,081 B2
(45) Date of Patent: Feb. 15, 2022

(54) HYDROCARBON BLOWN POLYURETHANE FOAM FORMULATION GIVING DESIRABLE THERMAL INSULATION PROPERTIES

(71) Applicant: Huntsman International LLC, The Woodlands, TX (US)

(72) Inventors: Sachchida N. Singh, The Woodlands, TX (US); Kristof Dedecker, Leefdaal (BE); Sheila Dubs, Conroe, TX (US); Paul Coleman, The Woodlands, TX (US)

(73) Assignee: HUNTSMAN Petrochemical LLC, The Woodlands, TX (US)

( * ) Notice: Subject to any disclaimer, the term of this patent is extended or adjusted under 35 U.S.C. 154(b) by 189 days.

(21) Appl. No.: 16/546,364

(22) Filed: Aug. 21, 2019

(65) Prior Publication Data

US 2019/0375878 A1     Dec. 12, 2019

Related U.S. Application Data

(62) Division of application No. 13/941,054, filed on Jul. 12, 2013, now Pat. No. 10,428,170.

(60) Provisional application No. 61/677,583, filed on Jul. 31, 2012.

(51) Int. Cl.
| *C08G 18/06* | (2006.01) |
| *C08G 18/08* | (2006.01) |
| *C08G 18/09* | (2006.01) |
| *C08G 18/16* | (2006.01) |
| *C08G 18/18* | (2006.01) |
| *C08G 18/20* | (2006.01) |
| *C08G 18/22* | (2006.01) |
| *C08G 18/42* | (2006.01) |
| *C08G 18/48* | (2006.01) |
| *C08G 18/50* | (2006.01) |
| *C08G 18/76* | (2006.01) |
| *C08J 9/14*  | (2006.01) |

(52) U.S. Cl.
CPC .............. *C08G 18/14* (2013.01); *C08G 18/06* (2013.01); *C08G 18/161* (2013.01); *C08G 18/4208* (2013.01); *C08G 18/4211* (2013.01); *C08G 18/4216* (2013.01); *C08G 18/4219* (2013.01); *C08G 18/4222* (2013.01); *C08G 18/4227* (2013.01)

(58) Field of Classification Search
CPC .............. C08G 18/161; C08G 18/4208; C08G 18/4211; C08G 18/4216; C08G 18/4219; C08G 18/4222; C08G 18/4227
See application file for complete search history.

(56) References Cited

U.S. PATENT DOCUMENTS

| 5,385,952 | A  | * | 1/1995  | Fishback   | C08G 18/3878 521/131 |
| 5,405,884 | A  | * | 4/1995  | Londrigan  | C08G 18/092 521/125 |
| 6,248,802 | B1 | * | 6/2001  | Singh      | C08J 9/146 521/131 |
| 6,319,962 | B1 | * | 11/2001 | Singh      | C08G 18/4208 521/170 |
| 2002/0013379 | A1 | * | 1/2002 | Singh      | C08J 9/146 521/174 |
| 2005/0222289 | A1 | * | 10/2005 | Miller    | B29C 44/468 521/155 |
| 2006/0084709 | A1 | * | 4/2006  | Dobransky | C08J 9/141 521/131 |
| 2009/0156704 | A1 | * | 6/2009  | Stowell   | C08J 9/0038 521/160 |
| 2012/0248371 | A1 | * | 10/2012 | Ross      | C08G 18/26 252/182.15 |
| 2013/0184369 | A1 | * | 7/2013  | Kampf     | C08G 18/14 521/173 |
| 2013/0331473 | A1 | * | 12/2013 | Motta     | C08G 18/7664 521/160 |
| 2014/0128492 | A1 | * | 5/2014  | Whitehouse | C08G 18/4072 521/170 |
| 2014/0371338 | A1 | * | 12/2014 | Chen      | C08G 18/7664 521/137 |
| 2015/0299376 | A1 | * | 10/2015 | Miyata    | C08G 65/34 521/131 |
| 2020/0362553 | A1 | * | 11/2020 | Vairo     | B32B 7/02 |

* cited by examiner

*Primary Examiner* — Melissa A Rioja

(74) *Attorney, Agent, or Firm* — Huntsman Petrochemical LLC; Robert A. Diaz

(57) ABSTRACT

Polyurethane/polyisocyanurate foam insulation described herein is derived from a composition that contains an organic polyisocyanate, an isocyanate reactive material containing at least about 20% by weight, based on the total weight of the composition, of an aromatic polyester polyol, a hydrocarbon blowing agent, a first catalyst selected from the group consisting of a carboxylate salt of an alkali metal, a carboxylate salt of an alkaline earth metal, a carboxylate salt of a quaternary ammonium, and combinations thereof, and a second catalyst comprising a non-reactive tertiary amine, wherein a molar ratio of the first catalyst to the second catalyst is less than about 1.25, the composition gels quickly, and the composition has an isocyanate index greater than about 175. Such an insulating foam has a ratio of thermal conductivity at 75° F. to thermal conductivity at 25° F. between about 0.98 and about 1.10.

8 Claims, No Drawings

HYDROCARBON BLOWN POLYURETHANE FOAM FORMULATION GIVING DESIRABLE THERMAL INSULATION PROPERTIES

CROSS-REFERENCE TO RELATED APPLICATIONS

This application is a divisional of U.S. patent application Ser. 13/941,054 filed Jul. 12, 2013, which claims priority to U.S. App. Ser. No. 61/677,583 filed Jul. 31, 2012, both of which are incorporated herein by reference.

BACKGROUND OF THE INVENTION

Field of the Invention

Embodiments described herein generally relate to polyurethane compositions for thermal insulation. More specifically, polyurethane/polyisocyanurate compositions are disclosed that have insulating properties with improved temperature stability

Description of the Related Art

Large scale commercial acceptance of closed cell rigid polyurethane or urethane-modified polyisocyanurate foams in the building insulation industry has developed from the balance of properties such materials provide. Rigid polyurethane foams are known to provide outstanding thermal insulation, excellent fire performance and superior structural properties, all at reasonably low density. In general, such rigid foams are prepared by reacting the appropriate polyisocyanate and isocyanate reactive compounds in the presence of blowing agents. The blowing agent of choice for polyurethane foam used in building insulation industry has been hydrocarbons. Hydrocarbons, such as cyclopentane, n-pentane, iso-pentane, iso-butane, provide desirable environmental characteristics and physical properties and are more economical as compared to halogen containing blowing agents such as hydrofluorocarbons (HFCs), hydrohaloolefins. Hydrocarbon blowing agents have zero ozone depletion potential and very low global warming potential. In addition they have desirable vapor pressure characteristics, low gas phase thermal conductivity and acceptable health and safety attributes.

Polyisocyanates and isocyanate reactive compounds particularly suited with hydrocarbon blowing agents for use as building insulation have been described in U.S. Pat. Nos. 6,248,802, 6,455,601, and 6,319,962, each of which is assigned to Huntsman LLC. Though such polyurethane foams meet the fire performance requirements, for example the ASTM E 84 tunnel test and the Factory Mutual 44450 calorimeter test, structural integrity requirements such as compression strength and dimensional stability, as specified for example in ASTM C 1289, and minimum thermal insulation requirements, as specified for example in ASTM C1289, at 75° F. mean temperature, it has been recently discovered that they do not meet the minimum thermal insulation requirements of ASTM C1289 at a lower temperature, 40° F. mean. This is evidenced by comparative examples in this application and in Mark S. Graham, "R-value Concerns," Professional Roofing, May 2010.

It is highly desirable that the polyurethane foams used as insulation in buildings provide good thermal insulation as measured by R-value per inch at all ambient temperatures. R-value per inch of foam insulation material is generally measured according to ASTM C518, "Standard Test Method for Steady-State Thermal Transmission Properties by Means of the Heat Flow Meter Apparatus" with a temperature differential of 20° F. or higher around the mean temperature. Thus when R-value is measured at 75° F. mean temperature, one surface of the insulation may be at 55° F. temperature and other 95° F. temperature. Inside of a building are nominally maintained at 65-75° F. but the outside temperature may vary to 0° F. or lower and 110° F. or higher depending on geographic location and time of the year. Of course, even at the same geographical location, temperature varies quite significantly between day and night and winter and summer. Thus it would be useful for polyurethane foam insulation to provide good insulation performance at a broad temperature range around the room temperature over a long period of time while meeting or exceeding fire performance and structural needs.

SUMMARY OF THE INVENTION

Embodiments described herein include a composition that contains an organic polyisocyanate, an isocyanate reactive material containing at least about 20% by weight, based on the total weight of the composition, of an aromatic polyester polyol, a hydrocarbon blowing agent, a first catalyst selected from the group consisting of a carboxylate salt of an alkali metal, a carboxylate salt of an alkaline earth metal, a carboxylate salt of a quaternary ammonium, and combinations thereof, and a second catalyst comprising a non-reactive tertiary amine, wherein a molar ratio of the first catalyst to the second catalyst is less than about 1.25, and wherein the composition has an isocyanate index greater than about 175. The composition may be an insulating foam or a precursor mixture of an insulating foam. Such an insulating foam has a ratio of thermal conductivity at 75° F. to thermal conductivity at 25° F. between about 0.98 and about 1.10.

An insulating member may be formed by forming a composition with an organic polyisocyanate, at least about 20% by weight of an aromatic polyester polyol, a hydrocarbon blowing agent comprising a $C_4$-$C_6$ hydrocarbon, a first catalyst comprising a salt selected from the group consisting of a carboxylate salt of an alkali metal, a carboxylate salt of an alkaline earth metal, a carboxylate salt of a quaternary ammonium, and combinations thereof, and a second catalyst comprising a non-reactive tertiary amine, wherein a molar ratio of the first catalyst to the second catalyst is about 1.25 or less, and dispensing the composition onto a substantially flat moving surface.

DETAILED DESCRIPTION

A rigid polyurethane/polyisocyanurate insulating foam member may be made that has a ratio of thermal conductivity at 75° F. to thermal conductivity at 25° F. that is between about 0.98 and about 1.10. Such insulating members are useful in environments having diverse and/or highly variable temperature conditions.

Insulating members may be made by a composition and a process for producing closed cell rigid polyisocyanurate foam having a ratio of k-factor at 75° F. mean temperature to that at 25° F. mean temperature equal to or greater than 0.98 that uses a reaction mixture having a minimum of 50% by weight based on the total weight of the foam forming composition of an organic polyisocyanate, a minimum of 20% by weight based on the total weight of the total foam forming composition of an aromatic polyester polyol, hydrocarbon blowing agent, carboxylate salt of an alkali metal, an alkaline earth metal or a quaternary ammonium as a first catalyst, a non-reactive tertiary amine as a second catalyst, and auxiliary substances and/or additives. A molar ratio of the first catalyst to the second catalyst is typically less than about 1.5, such as less than about 1.25, and the two catalysts are present in the reaction mixture in an amount such that the string time of the reaction mixture at the manufacturing condition is less than about 30 seconds.

A composition meeting the description above may be dispensed onto a moving surface, for example by spraying or extruding, to form a flat insulating foam member having the properties above. The moving surface may facilitate controlling the foam formation reaction by controlling temperature rise in the composition such that structural properties of the foam member develop at a desired rate. In this way, the process may be controlled with precision to allow optimal subsequent processing of the foam members.

Organic Polyisocyanate

Organic polyisocyanates suitable for use in embodiments described herein include any of the polyisocyanates known in the art for the production of rigid polyurethane or polyisocyanurate foams. Such organic polyisocyanates include aromatic, aliphatic and cycloaliphatic polyisocyanates and the combinations thereof. In particular the organic polyisocyanates include aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than about 2.0. Polyisocyanates modified with various groups containing ester groups, urea groups, biuret groups, allophanate groups, carbodiimide groups, isocyanurate groups, uretdione groups and urethane groups may also be used. Such modified isocyanates and methods for their preparation are known in the art. A most preferred isocyanate is those PMDI with diphenyl methane diisocyanate content of about 15 to about 42% by weight based on 100% by weight of the isocyanate.

The amount of organic polyisocyanates is typically about 45-75%, more preferably about 50-70% and most preferably about 53-65% by weight based on 100% of the total foam formulation. The amount of organic polyisocyanate in rigid polyisocyanaurate foam composition is often expressed in terms of isocyanate index which is defined as the actual amount of polyisocyanate used divided by the theoretically required stoichiometric amount of polyisocyanate required to react with all the active hydrogen in the reaction mixture, multiplied by 100. Isocyanate index is often expressed as (moles of isocyanate functionalities/moles of active hydrogen functionalities) times100. The isocyanate index is typically about 175-650, more preferably about 200-500 and most preferably about 225-400.

Aromatic Polyester Polyol

Suitable aromatic polyester polyols include those prepared by reaction of a polycarboxylic acid and/or a derivative thereof or an anhydride with a polyhydric alcohol, wherein at least one of these reactants is aromatic. The polycarboxylic acids may be any of the known aromatic, aliphatic, cycloaliphatic, and/or heterocyclic polycarboxylic acids and may be substituted, (e.g., with halogen atoms) and/or unsaturated. Examples of suitable aromatic polycarboxylic acids are: phthalic acid, isophthalic acid, terephthalic acid, and trimellitic acid. Suitable aromatic polycarboxylic acid derivatives are: dimethyl or diethyl esters of polycarboxylic acids such as phthalic acid, isophthalic acid, terephthalic acid, and trimellitic acid. Examples of suitable aromatic anhydrides are phthalic anhydride, tetrahydrophthalic anhydride, and pyromellitic anhydride.

Examples of suitable aliphatic polycarboxylic acids and anhydrides include oxalic acid, malonic acid, glutaric acid, pimelic acid, succinic acid, adipic acid, suberic acid, azelaic acid, sebacic acid, glutaric acid anhydride acid, maleic acid, maleic acid anhydride, fumaric acid, and dimeric and trimeric fatty acids, such as those of oleic acid which may be in admixture with monomeric fatty acids.

While the polyester polyols can be prepared from substantially pure reactant materials as listed above, more complex ingredients may be advantageously used, such as the side-streams, waste or scrap residues from the manufacture of phthalic acid, phthalic anhydride, terephthalic acid, dimethyl terephthalate, polyethylene terephthalate, and the like. Simple esters of polycarboxylic acids may also be used such as terephthalic acid dimethylester, terephthalic acid bisglycol and extracts thereof.

The polyhydric alcohols suitable for the preparation of polyester polyols may be aliphatic, cycloaliphatic, aromatic, and/or heterocyclic. The polyhydric alcohols optionally may include substituent which are inert in the reaction, for example, chlorine and bromine substituent, and/or may be unsaturated. Suitable amino alcohols, such as monoethanolamine, diethanolamine or the like may also be used. Examples of suitable polyhydric alcohols include ethylene glycol, propylene glycol, polyoxyalkylene glycols (such as diethylene glycol, polyethylene glycol, dipropylene glycol and polypropylene glycol), glycerol and trimethylolpropane. Examples of suitable aromatic polyhydric alcohols are 1,4, benzene diol, hydroquinone di (2-hydroxyethyl) ether, bis (hydroxyethyl) terephthalate, and resorcinol.

There are a number of aromatic polyester polyols commercially available. STEPANPOL® PS-2352, PS-2412, PS-3152, PS-2402, PS-2002 are some such polyols manufactured by the Stepan Company. ISOEXTER® 3061, 4404 are some such polyols, manufactured by Coim USA, Inc. Terate® 3510, 3512, 2541, 4420 are some such polyols, manufactured by Invista Corporation. Terol® 563, 1154, 250 are some such polyols manufactured by Oxid, Inc.

The amount of aromatic polyester polyols organic is typically about 20-40%, more preferably about 25-35% and most preferably about 27-33% by weight based on the total foam formulation.

Hydrocarbon Blowing Agent

One or more hydrocarbon blowing agents which are vaporizable under foam forming conditions may be used. Such hydrocarbon blowing agent are generally unsubstituted $C_4$-$C_6$ aliphatic or cycloaliphatic compounds with boiling point of 70° C. or less at one atmosphere. Suitable hydrocarbons include butane, isobutane, isopentane, n-pentane, cyclopentane, 1-pentene, n-hexane, iso-hexane, 1-hexane, n-heptane, isoheptane, and mixtures thereof. Preferably the hydrocarbon blowing agent is isopentane, n-pentane, cyclopentane or mixtures thereof. For example, a blend of isopentane to n-pentane in a ratio of 80:20 to 80:20 parts by weight may be used as a blowing agent.

Other physical blowing agents such as vaporizable non-hydrocarbons may also be used in the present process in combination with the hydrocarbon blowing agents. Suitable blowing agents include 1,1,1,3,3-pentafluoropropane (HFC- 245fa), 1,1,1,3,3-pentafluorobutane (HFC-365mfc), 1,1,1,2-tetrafluorethane (HFC-134a), 11-difluoroethane (HFC-152a), difluoromethane (HFC-32). In addition, the suitable other blowing agents include hydrofluoroalkenes such as of 1-chloro-3,3,3-trifluoropropene (HCFO-1233zd), 1,1,1,4,4,4-hexafluoro-2-butene (HFO-1336mzz), and 2,3,3,3-tetrafluoroprop-1-ene (HFO-1234yf) along with any or all isomers including stereo-isomers (e.g., cis-, trans-, or mixture thereof).

The blowing agent component may also include one or more chemical blowing agents. For example, water and/or carboxylic acids which react with isocyanate under foam forming conditions to liberate $CO_2$.

The blowing agents are employed in an amount sufficient to give the resultant foam the desired density between 1.2 to 4.2 lb/cu.ft, preferably 1.3 to 3.5 lb/cu. ft., and most preferably 1.4 to 3.0 lb/cu. ft. The hydrocarbon blowing agent should be used in an amount of from about 2% to about 20% and preferably from about 4% to about 15% by weight based on the weight of the entire reaction system. In some embodiments, the reaction system contains at least 0.2% and less than 2% by weight of water relative to the total weight of the reaction system. In other embodiments, water is at least 0.1% by weight of the total weight of the reaction system but less than 1.5%, 1.0%, or 0.5% by weight of the reaction system. These blowing agents may be mixed into the isocyanate-reactive component, the isocyanate component and/or as a separate stream to the reaction system.

Carboxylate Salt of an Alkali Metal, an Alkaline Earth Metal or a Quaternary Ammonium as Catalyst The trimerization catalyst may be an alkali metal carboxylate salt, an alkaline earth metal carboxylate salt, a quaternary ammonium carboxylate salt, or any combination thereof. Such carboxylate salts can be have the general formula Z—COO—M, wherein Z is a hydrogen atom, or a $C_1$-$C_{17}$ alkyl, alkenyl, aryl, or arylalkyl, any of which are substituted or unsubstituted, and M is an alkali metal ion, an alkaline earth metal ion, or a quaternary ammonium ion.

Examples of alkyl groups which can be present in the carboxylate salt include methyl, ethyl, propyl, butyl, pentyl, hexyl, heptyl, octyl, nonyl, or decyl, and the like. Examples of alkenyl groups include ethenyl, propenyl, butenyl, pentenyl, hexenyl, heptenyl, octenyl, nonenyl, decenyl, and the like. Aryl and arylalkyl groups include phenyl, tolyl, benzyl, dimethylphenyl, trimethylphenyl, phenylethyl, phenylpropyl, phenylbutyl, propyl-2-phenylethyl, and the like. Preferred Z is a hydrogen atom, methyl, ethyl, propyl, butyl, pentyl, hexyl, heptyl, or octyl. Most preferred Z is a methyl, ethyl, 2-ethyl hexyl or octyl.

Examples of alkali metal ions, M are lithium, sodium, potassium, and rubidium. Examples of alkali earth metal ions, M are magnesium and calcium. Quaternary ammonium ions useful in embodiments described herein include tetramethylammonium, tetraethylammonium, tetrapropylammonium, tetrabutylammonium, trimethyl(2-hydroxypropyl)ammonium, triethyl(2-hydroxypropyl)ammonium, tripropyl(2-hydroxypropyl)ammonium, tributyl(2-hydroxypropyl)ammonium, trimethyl(2-hydroxyethyl)ammonium, triethyl(2-hydroxyethyl)ammonium, tripropyl(2-hydroxyethyl)ammonium, tributyl(2-hydroxyethyl)ammonium, dimethylbenzyl(2-hydroxypropyl)ammonium, dimethylbenzyl(2-hydroxyethyl)ammonium, and the like, or any combination thereof. Preferred metal ions are potassium and sodium and most preferred are potassium. Preferred ammonium ion is trimethyl(2-hydroxypropyl)ammonium.

Useful carboxylate salts include potassium formate, potassium acetate, potassium propionate, potassium butanoate, potassium pentanoate, potassium hexanoate, potassium neohexanoate, potassium heptanoate, potassium octoate, potassium neooctoate, potassium 2-ethylhexanoate, potassium decanoate, potassium butyrate, potassium isobutyrate, sodium octoate, lithium octoate, trimethyl(2-hydroxypropyl)ammonium formate, trimethyl(2-hydroxypropyl)ammonium 2-ethylhexonate and the like, or any combination thereof. Most preferred carboxylate salt is potassium acetate, for example Pel-cat® 9650 or Polycat® 46, potassium 2-ethylhexanoate, for example Pel-cat® 9540a, Polycat® K-15, or Dabco® T-45, trimethyl(2-hydroxypropyl)ammonium formate, for example Dabco® TMR-2, trimethyl(2-hydroxypropyl)ammonium 2-ethylhexonate, for example Dabco® TMR, or any combination thereof.

Non-Reactive Tertiary Amine Catalyst

Suitable classes of non-reactive tertiary amines are trialkylamines, alkyl/alkylaryl amines, aliphatic polyamines, cyclic amines, ether amines, and saturated heterocyclic amines. Suitable catalytic trialkylamines include trimethylamine; triethylamine, for example Dabco® TETN; and tributylamine. Suitable catalytic alkyl/alkylaryl amines include N,N-dimethylcyclohexylamine, for example JEFFCAT® DMCHA; N,N-diethylcyclohexylamine; N,N-dimethylbenzylamine, for example JEFFCAT® BDMA; N-methyl dicyclohexylamine, for example Polycat 12; N,N-dimethylaniline; N,N-diethylaniline; and N,N,N',N'-tetrametyl-1,4-phenylenediamine. Suitable catalytic aliphatic polyamines include N,N,N',N'-tetramethylethylenediamine, for example TOYOCAT® TE; N,N,N',N'-tetramethylhexanediamine, for example TOYOCAT® MR; N,N,N',N'-tetraethylethylenediamine; N,N,N',N'-tetrmethylpropylendiamine, for example PC CAT® TMPDA; and N,N,N',N'-tetramethyl-1,3-butanediamine. Suitable catalytic aliphatic polyamines catalysts with three tertiary amines include N,N,N'',N''-tetrmethyldipropylentriamine, for example Polycat® 15; N,N,N',N'',N''-pentamethyldiethylentriamine, for example JEFFCAT® PMDETA; N,N,N',N'',N''-pentamethyldipropylentriamine, for example JEFFCAT® ZR-40; and 1,1,4,7,7-pentamethyldiethylene-triamine. Suitable catalytic aliphatic polyamines catalysts with four tertiary amines include tris(dimethylaminopropyl)amine, for example Polycat® 9; tris[2-(dimethylamino)ethyl]amine; N,N'-bis-(dimethylaminopropyl)-N,N'-dimethylethylenediamaine; hexamethylen-triethylene tetramine; and N-dimethylaminopropyl-N,N',N''-tetramethyldiethylene triamine. Suitable catalytic aliphatic polyamines catalysts with five tertiary amines include N,N''-bis-(dimethylaminopropyl)-N,N',N''-trimethyldiethylene triamine.

Useful cyclic tertiary amines include triethylenediamine, also known as diazabicyclooctane, an example of which is JEFFCAT® TD-100; 1,4-ethylene piperidine, also known as quinuclidine and Quincat; imidazole compounds such as N-methylimidazole, for example PC CAT® NMI; 1,2-dimethylimidazoles such as TOYOCAT® DMI; N,N',N''-dimethylaminopropylhexahydrotriazines such as JEFFCAT® TR-90; hexahydro-1,3,5-tris[3(N,N-dimethylamino)ethyl]-1,3,5-triazine; hexahydro-1,3,5-tris[3(N,N-ethylmethylamino)propyl]-1,3,5-triazine; hexahydro-1,3,5-tris[3(N,N-diethylamino)propyl]-1,3,5-triazine; hexahydro-1,3,5-tris[3(N,N-dimethylam ino)butyl]-1,3,5-triazine; 1,8-diazabicyclo(5,4,0)undecene-7, for example Polycat® DBU; ether amines such as bis[2-(N,N-dimethylamino)alkyl]ethers, for example bis-[2-(N,N-dimethylamino)ethyl]ether, also known as JEFFCAT® ZF-20; and N,N,N'-trimethyl-N'-(dimethylaminoethyl)-bis-aminoethyl)-ether.

Useful saturated heterocyclic tertiary-amines include compounds such as N-methylmorpholine, for example JEFFCAT® NMM; N-ethylmorpholine, for example JEFFCAT® NEM; N,N-dimethylaminoethyl morpholine, for example Dabco® XDM; N,N'-dimorpholinodiethylether, for example JEFFCAT® DMDEE; N,N'-dimethylpiperazine, for example JEFFCAT® DMP; and N-methyl-N'-(2-dimethylamino)ethyl-piperazine, for example TOYOCAT® NP.

Another class of polyamine which can be used as a second catalyst are 2,4,6-tris(N,N-dialkylaminomethyl)phenols such as 2,4,6-tris(N,N-dimethylaminomethyl)phenol, for example Dabco® TMR-30, which contain a phenolic hydroxyl group.

The above non-reactive tertiary amines can also be used as their acid blocked derivatives, wherein the acid is carboxylic acid, sulphonic acid, phenolic acid, acetic acid and fatty acid. Suitable carboxylic acids include formic, acetic, propionic, butanoic, butyric, isobutyric, hexanoic, heptanoic, octanoic, 2-ethyl-hexanoic, nonanoic, decanoic, undecanoic, and dodecanoic. Suitable fatty acid include myristic, palmitic, stearic, oleic, linoleic, linolenic, ricinoleic. Preferred acid include formic acid, 2-ethyl hexanoic acid, acetic, phenolic acid and adipic acid. Some examples of commercially available acid blocked non-reactive tertiary amine catalysts are Dabco® 8154, Polycat® SA-1, and Polycat® SA-102. Depending on the catalyst selected, mixtures of two or more catalysts may be used.

Amounts of Catalyst

The molar ratio of first catalyst to second catalyst is less than about 1.5, such as less than about 1.25, for example less than about 1.0, and the total amount of first and second catalyst in the composition is such that the string time at the manufacturing condition is less than about 30 seconds. As illustrated in Examples below, when the foam formulation is such that the molar ratio of first catalyst to second catalyst is less than about 1.5, for example less than about 1.25, the foam retains all desirable structural and insulating properties for commercial application while also achieving a ratio of k-factor at 75° F. mean temperature to that at 25° F. mean temperature less than 0.98, providing excellent insulation irrespective of season.

The catalysts described above may be formulated as blends with diluents that may be non-catalytic components such as diethylene glycol or dipropylene glycol, primarily to facilitate handling of the product. When calculating the molar ratio of first to second catalyst, only the active ingredients are considered.

Along with the molar ratio of first to second catalyst defined above, the total amount of catalyst in the composition is typically such that the string time of the foam formulation at the manufacturing condition is less than 30 seconds. String time is measured by putting the thin edge of a wooden, medical tongue depressor into expanding foam once every second and observing when a trail of strings is pulled by the tongue depressor from the expanding foam. The string time is defined as the length of time after mixing of the isocyanate with remaining chemicals to the point when a string is first pulled. A string time of less than 30 second, preferably less than 20 seconds and more preferably less than 15 second at the chemical temperature of 80-95° F., typical in today's manufacturing, allows sufficient time for curing the foam for handling in typical production processes.

Tack free time is the time required from initial mixing for the foam to achieve a condition such that an exposed surface thereof is tack free when contacted lightly by the flat side of wooden, medical tongue depressor. A tack free time of less than 40 second, preferably less than 35 seconds and more preferably less than 30 second at the chemical temperature of 80-95° F., typical in today's manufacturing, also facilitates handling in typical production processes.

To achieve the desired string time and tack free time, the second catalyst is typically present in the composition at a concentration of at least about 3.0 millimoles per 100 grams of the composition, for example at least about 4.0 millimoles per 100 grams, or at least about 4.5 millimoles per 100 grams.

Auxiliary Substances and/or Additives

The foam composition may also contain various auxiliary agents and additives as needed for a particular purpose and known in the art. Suitable auxiliaries and additives include crosslinking agents, such as triethanolamine and glycerol; foam stabilizing agents or surfactants, such as siloxane-oxyalkylene copolymers; oxyethylene-oxyalkylene copolymer; flame retardants such as organo-phosphorous compounds, which includes organic phosphates such as triethyl phosphate, phosphites, phosphonate such as diethyl ethyl phosphonate, polyphosphates, polyphosphites, polyphosphonate, ammonium polyphosphate, and halogenated compounds such as tris(2-chloropropyl)-phosphate, tetrabromophthalate esters, and chlorinated parrafins; catalysts other than those described earlier; viscosity reducers such as propylene carbonate, 1-methyl-2-pyrrolidinone; infra-red opacifiers such as carbon black, titanium dioxide, and metal flakes; cell-size reducing compounds such as inert, insoluble fluorinated compounds and perfluorinated compounds; reinforcing agent such as nano-clay, glass fibers and ground up foam waste; mold release agents such as zinc stearate; antioxidents such as butylated hydroxy toluene; and pigments such as azo-/diazo dyestuff and phthalocyanines.

In addition the foam composition may also contain isocyanate-reactive polyols other than the aromatic polyester polyols. Examples of polyols include polyether polyols, aliphatic polyester polyols and mixtures thereof, having equivalent weights from about 40 to about 4000 of preferably about 50 to about 3000 and average hydroxyl functionalities of about 2 to about 8 and preferably about 2 to about 6. Further examples of suitable polyol include active hydrogen-terminated polythioethers, polyamides, polyester amides, polycarbonates, polyacetals, polyolefins and polysiloxanes.

Amount of such additives are generally between about 0.1-20%, preferably between about 0.3-15% and most preferably between about 0.5-10%, by weight based on 100% of the total foam formulation.

Ratio of K-Factor at 75° F. to that at 25° F.

The insulating members made using the insulating foams described herein typically have a ratio of k-factor at 75° F. to k-factor at 25° F. that is between about 0.98 and about 1.10. The k-factor is a measurement of the thermal conductivity of insulating materials, in this case the rigid polyisocyanurate foam. The lower the k-factor of the rigid foam the better its insulating property. The k-factor of foam is nominally measured by following ASTM C578 with a temperature differential between the plates of 40° F. and using a 8"×8"×1" thick or larger foam cut from the core of the produced foam within the first week of production.

The rigid polyisocyanurate foams described herein may be produced in the form of slabstock, mouldings, cavity filling, sprayed foam, frothed foam or laminates with other material such as paper, metal, plastics, or wood-board.

EXAMPLES

The following materials are referred to in the examples:

STEPANPOL® PS-2352: An aromatic polyester polyol product of hydroxyl value 235 mg KOH/g available from Stepan Company, of Northfield, Ill. The aromatic polyester polyol content of this polyol is above 80% by weight.

STEPANPOL® PS-3152: An aromatic polyester polyol product of hydroxyl value 315 mg KOH/g available from Stepan Company. The aromatic polyester polyol content of this polyol is above 80% by weight.

Terol® 563: An aromatic polyester polyol product of hydroxyl value 245 mg KOH/g available from Oxid L.P. The aromatic polyester polyol content of this polyol is above 80% by weight.

ISOEXTER® 4404-US : An aromatic polyester polyol product of hydroxyl value 238 mg KOH/g available from Coim USA, Inc., of West Deptford, N.J. The aromatic polyester polyol content of this polyol is above 80% by weight.

ISOEXTER® 3061-US : An aromatic polyester polyol product of hydroxyl value 319 mg KOH/g available from Coim USA, Inc. The aromatic polyester polyol content of this polyol is above 80% by weight.

Terate® 3510: An aromatic polyester polyol product of hydroxyl value 243 mg KOH/g, from INVISTA, of Wichita, Kans. The aromatic polyester polyol content of this polyol is above 80% by weight.

Polyether polyol A: An aromatic amine-based polyether polyol of hydroxyl value 500 mg KOH/g and a viscosity of 18000 cPs at 25° C.

Polyether polyol B: A sucrose glycerol based polyether polyol of hydroxyl value 360 mg KOH/g and a viscosity of 2500 cPs at 25° C.

PEL-CAT® 9540-A: A 70% solution of potassium 2-ethylhexanoate (also known potassium octoate) in diethylene glycol available from Ele Corporation, of Lyons, Ill.

PEL-CAT® 9650: A 25% solution of potassium acetate in diethylene glycol available from Ele Corporation.

DABCO® TMR-2: A 51% solution of N-(2-hydroxypropyl)-N-trimethylammonium formate in dipropylene glycol available from Air Products and Chemicals, Inc., of Allentown, Pa.

JEFFCAT® PMDETA catalyst: N,N,N',N",N"-pentamethyldiethylentriamine, a non-reactive tertiary amine catalyst available from Huntsman LLC, of The Woodlands, Tex.

JEFFCAT® DMCHA catalyst: N,N-dimethylcyclohexylamine, a non-reactive tertiary amine catalyst available from Huntsman LLC.

JEFFCAT® ZF-22 catalyst: A 70:30 mixture of bis-[2-(N,N-dimethylamino)ethyl]ether in dipropylene glycol, a non-reactive tertiary amine catalyst available from Huntsman LLC.

JEFFCAT® BDMA catalyst: N,N-dimethylbenzylamine a non-reactive tertiary amine catalyst available from Huntsman LLC.

JEFFCAT® DMEA catalyst: N,N-dimethylethanolamine, a reactive tertiary amine catalyst available from Huntsman LLC.

JEFFCAT® ZR-50 catalyst: 2-propanol, 1-(bis(3-(dimethylamino)propyl)amino), a reactive tertiary amine catalyst available from Huntsman LLC.

JEFFCAT® DPA catalyst: 2-propanol, 1,1'-(3-(dimethylamino)propyl)imino)bis, a reactive tertiary amine catalyst available from Huntsman LLC.

TCPP: Tri(beta-chloropropyl)phosphate available from Lanxess Corporation, of Pittsburgh, Pa.

TEP: Triethyl Phosphate available from Eastman Chemical Corporation, of Kingsport, Tenn.

SAYTEX® RB79: A bromine-containing diester/diol of tetrabromophthalic anhydride available from Albemarle Corporation, of Baton Rouge, La.

VORASURF® 504: a non-silicone surfactant available from Dow Chemical Co., of Midland, Mich.

SILBYK® TP 3805: A polyether-modified polysiloxane surfactant available from BYK Chemie, of Wallingford, Conn.

TEGOSTAB® B 8535: A polyether-modified polysiloxane surfactant available from Goldschmidt Polyurethane Additives, of Essen, Germany.

Cyclopentane: Available from ExxonMobil Chemical Company, of Houston, Tex., and having purity >95%.

Isopentane: Available from ConocoPhillips, of Houston, Tex., and having purity >97%.

N-Pentane: Available from ConocoPhillips and having purity >97%.

RUBINATE® 1850 isocyanate: A high functionality polymethylene polyphenylene polyisocyanate of NCO value 30.6% available from Huntsman LLC.

Example 1

Rigid polyisocyanurate foams were prepared from the formulations set forth in Table 1 below using an Edge-Sweets high pressure impingement mix, foam dispensing machine. All components listed except the pentanes and isocyanate were mixed and added to the "polyol side" tank of an Edge-Sweets machine. An appropriate amount of pentane, based on the compositions set forth in Table 1, was then added to the polyol side and mixed vigorously using an air-mixer attached to the tank. The isocyanate was then added to the "isocyanate side" tank attached to the dispensing machine.

Metered amounts of material from the polyol side tank and isocyanate side tank were injected into the two sides of the high pressure impingement mixing chamber, mixed and dispensed into a 14" wide, 4" deep and 36" long mold, lined on both side with fibrous glass mat facer. The mold sat on a conveyor having a flat surface that moved when the foam was poured into the mold. The conveyor speed was adjusted so that a "just fill" foam board with cell orientation typical of a commercial laminate production process was obtained. Following conditions were used to make all laminates:

Chemical throughput=23 lb/min.
Mix pressure=2000 psi
Chemical temperature at mix-head=80° F.
Mold temperature=140° F.
Demold time=4 minutes Foam reactivity was measured using a wooden, medical tongue depressor on free rise foam made by dispensing about 200 gm of foam into #10 Lily cup. The foam core density was measured according to ASTM D-1622. The k-factor of core foam was measured according to ASTM C-518 by cutting a 12"×12"×1" thick foam from the core of the produced foam laminate between 1-3 days of production. To measure the k-factor at 75° F. mean temperature, the hot and cold plate of the heat flow meter was maintained at 55° F. and 95° F. respectively. Similarly, to measure the k-factor at 25° F. mean temperature, the hot and cold plate of the heat flow meter was maintained at 5° F. and 45° F. respectively. PIR/PUR ratio of the foam was measured following the method outlined in the paper titled "The PIR/PUR Ratio" on page 234-240 of the Proceedings of Polyurethanes World Congress 1993. The higher the ratio, better is the flammability and structural performance of the foam.

The flammability properties of the foam laminate were measured on 4"×4"×full thickness laminates following a hot plate test method based on the one outlined in the paper titled "Flammability Study of Hydrocarbon-Blown Isocyanurate Foams" on page 561-567 of the Proceedings of Polyurethanes Congress 1994. In this test, the closer the weight and thickness retention is to 100%, the better is the flammability properties of the foam laminate.

The structural performance of the foam laminate was characterized by measuring dimensional changes after 7 days of exposure at −40° F. of 12"×12"×full thickness laminates following the ASTM D-2126. In this test, the closer the % linear change is to zero, the better the dimensional performance of the foam. Structural property of the foam laminate is also characterized by compressive strength measurements parallel to the thickness directions following the ASTM D-1621, Procedure A. A higher the compressive strength indicates better foam structural performance.

Foam formulations 1 and 3 represent the current practice and formulations 2 and 4 represent foams prepared using the formulations described herein. A low k-factor value at 75° F. mean temperature and at 25° F. mean temperature using the catalyst package described herein indicate good insulation irrespective of season. Comparative foam formulations 1 and 3 give poorer insulation performance at lower temperature. The remaining foam properties, namely flammability and structural performance, of example and comparative foam laminates are equivalent. Thus use of the formulations and methods described herein results in foam insulating members having all the advantages of commercially available formulations while improving the low temperature insulation performance.

TABLE 1

| | Type | | | |
|---|---|---|---|---|
| | Comp | Ex | Comp | Ex |
| | \multicolumn{4}{c}{Foam #} | | | |
| | 1 | 2 | 3 | 4 |
| Formulation | | | | |
| STEPANPOL ® PS-2352 | 29.53 | 29.50 | 28.55 | 28.86 |
| TCPP | 3.00 | 3.00 | 3.00 | 3.00 |
| PEL-CAT ® 9540-A | 1.25 | 0.70 | — | — |
| DABCO ® TMR-2 | — | — | 2.00 | 1.10 |
| JEFFCAT ® PMDETA catalyst | — | — | 0.50 | — |
| JEFFCAT ® DMCHA catalyst | 0.27 | 0.84 | — | 1.10 |
| VORASURF ® 504 | 0.60 | 0.60 | 0.60 | 0.60 |
| Water | 0.11 | 0.11 | 0.11 | 0.11 |
| N-pentane | 5.77 | 5.77 | 4.12 | 4.12 |
| Iso-pentane | 2.47 | 2.47 | 4.12 | 4.12 |
| RUBINATE ® 1850 isocyanate | 57.00 | 57.00 | 57.00 | 57.00 |
| Calculated Parameters | | | | |
| Index | 283 | 292 | 279 | 292 |
| milimoles of first catalyst | 4.79 | 2.69 | 6.40 | 3.51 |
| millimoles of second catalyst | 2.16 | 6.61 | 2.89 | 8.64 |
| Molar ratio of first to second catalyst | 2.22 | 0.41 | 2.22 | 0.41 |
| Foam reactivity | | | | |
| Gel time, seconds | 16 | 16 | 16 | 13 |
| Tack free time, seconds | 21 | 22 | 19 | 19 |
| Core foam properties | | | | |
| Foam density, pcf | 1.69 | 1.71 | 1.78 | 1.76 |
| k-factor, BTU · in/ft$^2$ · hr · ° F. | | | | |
| at 75° F. mean temperature | 0.155 | 0.157 | 0.159 | 0.165 |
| at 25° F. mean temperature | 0.165 | 0.159 | 0.170 | 0.162 |
| Ratio of k-factor at 75° F. to 25° F. | 0.94 | 0.99 | 0.94 | 1.02 |
| PIR/PUR ratio | 2.0 | 2.2 | 1.7 | 1.7 |
| 4" Laminate properties | | | | |
| Hot Plate flammability test | | | | |
| % weight retention | 88 | 87 | 87 | 85 |
| % thickness retention | 87 | 88 | 82 | 78 |
| Structural performance | | | | |
| Compressive strength, rise, psi | 18.2 | 18.1 | 17.6 | 18.2 |
| Dimensional stab, % linear change | | | | |
| in length and width direction | −0.2 | 0.6 | 0.0 | −0.1 |
| in thickness direction | −1.5 | −0.6 | −0.3 | −0.5 |

Example 2

Rigid polyisocyanurate foams were prepared from the formulations set forth in Table 2 following the process outlined in Example 1. Table 2 shows the results of three side by side pair-wise comparisons (i.e., formulations 5 vs. 6; 7 vs.8 and 9 vs.10), each pair differentiated from the others by source of polyol and the pentane isomers. The data for each pair demonstrate the effect of changing the molar ratio of first catalyst to second catalyst from high values such as 3.3-5.0 to a lower value of 0.41-0.43. The observed effects include a ratio of k-factor at 75° F. to that at 25° F. that is closer to one indicating a uniformly good insulation performance across the temperature, lower molded laminate core foam density for the same blowing agent level resulting in higher blowing efficiency, and higher PIR/PUR ratio indicating improved conversion to more heat stable isocyanurate bonds.

TABLE 2

| | Type | | | | | |
|---|---|---|---|---|---|---|
| | Comp | Ex | Comp | Ex | Comp | Ex |
| | Foam # | | | | | |
| | 5 | 6 | 7 | 8 | 9 | 10 |
| Formulation | | | | | | |
| Terol ® 563 | 27.62 | 27.56 | — | — | — | — |
| ISOEXTER ® 4404-US | — | — | 30.12 | 30.08 | — | — |
| Terate ® 3510 | — | — | — | — | 29.35 | 29.16 |
| TCPP | 4.87 | 4.87 | 3.00 | 3.00 | 3.00 | 3.00 |
| PEL-CAT ® 9540-A | 1.15 | 0.65 | 1.25 | 0.70 | 1.25 | 0.80 |
| PEL-CAT ® 9650 | 0.23 | 0.13 | — | — | — | — |
| DABCO ® TMR-2 | — | — | — | — | — | — |
| JEFFCAT ® PMDETA catalyst | 0.17 | — | 0.25 | — | — | — |
| JEFFCAT ® DMCHA catalyst | — | 0.84 | — | 0.84 | — | 0.96 |
| JEFFCAT ® ZF-22 catalyst | — | — | — | — | 0.31 | — |
| VORASURF ® 504 | 0.60 | 0.60 | 0.60 | 0.60 | 0.60 | 0.60 |
| Water | 0.11 | 0.11 | 0.08 | 0.08 | 0.11 | 0.11 |
| N-pentane | 8.25 | 8.25 | 3.85 | 3.85 | — | — |
| Iso-pentane | — | — | 3.85 | 3.85 | 2.52 | 2.52 |
| Cyclo-pentane | — | — | — | — | 5.87 | 5.87 |
| RUBINATE ® 1850 isocyanate | 57.00 | 57.00 | 57.00 | 57.00 | 57.00 | 57.00 |
| Calculated Parameters | | | | | | |
| Index | 286 | 298 | 281 | 286 | 279 | 287 |
| milimoles of first catalyst | 5.03 | 2.83 | 4.8 | 2.70 | 4.80 | 3.06 |
| millimoles of second catalyst | 1.00 | 6.64 | 1.44 | 6.63 | 1.36 | 7.52 |
| Molar ratio of first to second catalyst | 5.03 | 0.43 | 3.32 | 0.41 | 3.52 | 0.41 |
| Foam reactivity | | | | | | |
| Gel time, seconds | 17 | 14 | 20 | 17 | 19 | 14 |
| Tack free time, seconds | 23 | 21 | 25 | 22 | 24 | 20 |
| Core foam properties | | | | | | |
| Density, pcf | 1.75 | 1.64 | 2.03 | 1.77 | 1.65 | 1.50 |
| k-factor, BTU · in/ft$^2$ · hr · ° F. | | | | | | |
| at 75° F. mean temperature | 0.155 | 0.156 | 0.157 | 0.151 | 0.152 | 0.154 |
| at 25° F. mean temperature | 0.195 | 0.160 | 0.180 | 0.153 | 0.181 | 0.154 |
| Ratio of k-factor at 75° F. to 25° F. | 0.79 | 0.98 | 0.87 | 0.99 | 0.84 | 1.00 |
| PIR/PUR ratio | 2.1 | 2.2 | 2.0 | 2.1 | 1.9 | 2.0 |

Example 3

Rigid polyisocyanurate foams were prepared from the formulations set forth in Table 3 following the process outlined in Example 1. Table 3 shows the effect of changes in catalyst amounts. Significant improvement is observed in ratio of k-factor at 75° F. to that at 25° F. when the molar ratio of first to second catalyst moves from the currently practiced high value to a significantly lower value.

TABLE 3

| | Type | | | | | |
|---|---|---|---|---|---|---|
| | Comp | Comp | Ex | Ex | Ex | Ex |
| | Foam # | | | | | |
| | 11 | 12 | 13 | 14 | 15 | 16 |
| Formulation | | | | | | |
| STEPANPOL ® PS-2352 | 28.81 | 29.24 | 29.29 | 29.40 | 29.43 | 28.93 |
| TCPP | 4.23 | 4.23 | 3.00 | 3.00 | 3.00 | 3.00 |
| PEL-CAT ® 9540-A | 1.07 | 0.81 | 1.00 | 0.80 | 0.60 | 0.60 |
| JEFFCAT ® PMDETA catalyst | 0.21 | 0.16 | — | — | — | — |
| JEFFCAT ® DMCHA catalyst | — | — | 0.60 | 1.00 | 1.20 | 1.20 |
| TEGOSTAB ® B 8535 | 0.56 | — | 0.45 | — | — | — |
| SILBYK ® TP 3805 | — | 0.56 | | — | — | — |
| VORASURF ® 504 | — | — | | 0.60 | 0.60 | 0.60 |
| Water | 0.16 | 0.16 | 0.11 | 0.11 | 0.11 | — |
| N-pentane | 4.00 | 4.00 | 4.27 | 4.05 | 4.05 | 4.34 |

TABLE 3-continued

|  | Type | | | | | |
|---|---|---|---|---|---|---|
|  | Comp | Comp | Ex | Ex | Ex | Ex |
|  | Foam # | | | | | |
|  | 11 | 12 | 13 | 14 | 15 | 16 |
| Iso-pentane | 4.00 | 4.00 | 4.27 | 4.05 | 4.05 | 4.34 |
| RUBINATE ® 1850 isocyanate | 56.95 | 56.83 | 57.00 | 57.00 | 57.00 | 57.00 |
| Calculated Parameters | | | | | | |
| Index | 280 | 280 | 288 | 292 | 295 | 328 |
| milimoles of first catalyst | 4.10 | 3.12 | 3.85 | 3.08 | 2.31 | 2.30 |
| millimoles of second catalyst | 1.23 | 0.94 | 4.73 | 7.87 | 9.46 | 9.43 |
| Molar ratio of first to second catalyst | 3.33 | 3.33 | 0.81 | 0.39 | 0.24 | 0.24 |
| Foam reactivity | | | | | | |
| Gel time, seconds | 23 | 28 | 14 | 11 | 14 | 11 |
| Tack free time, seconds | 33 | 41 | 23 | 20 | 36 | 25 |
| Foam Properties | | | | | | |
| Foam density, pcf | 1.68 | 1.72 | 1.56 | 1.75 | 1.70 | 1.75 |
| k-factor, BTU · in/ft$^2$ · hr · ° F. | | | | | | |
| at 75° F. mean temperature | 0.147 | 0.153 | 0.151 | 0.152 | 0.154 | 0.154 |
| at 25° F. mean temperature | 0.177 | 0.179 | 0.154 | 0.145 | 0.148 | 0.151 |
| Ratio of k-factor at 75° F. to 25° F. | 0.83 | 0.85 | 0.98 | 1.05 | 1.04 | 1.02 |

Example 4

Additional rigid polyisocyanurate foams were prepared using the formulations set forth in Table 4 following the process outlined in Example 1. The results in Table 4 indicate that removal of fire retardant (foam 17), drastic changes to amounts of isocyanate and polyol or isocyanate index (foam 18), or addition of polyether polyol (foams 19 and 20) to a conventional formulation does not yield the improved ratio of k-factor at 75° F. to that at 25° F. As seen in foams 21 and 22, a low molar ratio of first to second catalyst results in a foam with good insulation performance at either 75° F. or at 25° F. average temperature, irrespective of the other parameters of the formulation.

TABLE 4

|  | Type | | | | | |
|---|---|---|---|---|---|---|
|  | Comp | Comp | Comp | Comp | Ex | Ex |
|  | Foam # | | | | | |
|  | 17 | 18 | 19 | 20 | 21 | 22 |
| Formulation | | | | | | |
| STEPANPOL ® PS-2352 | 30.43 | 36.92 | 20.96 | — | 28.46 | 28.28 |
| Polyether polyol A | — | — | 5.24 | 12.47 | — | — |
| Polyether polyol B | — | — | — | 29.10 | — | — |
| TCPP | — | 4.23 | 4.23 | — | 2.85 | 2.83 |
| PEL-CAT ® 9540-A | 1.07 | 1.07 | 1.07 | — | 1.06 | 1.06 |
| PEL-CAT ® 9650 | — | — | — | 0.46 | — | — |
| JEFFCAT ® PMDETA catalyst | 0.21 | 0.21 | 0.21 | 0.91 | 0.21 | 0.11 |
| JEFFCAT ® DMCHA catalyst | — | — | — | 1.83 | 0.53 | 0.85 |
| SILBYK ® TP 3805 | 0.56 | 0.56 | 0.56 | — | — | — |
| VORASURF ® 504 | — | — | — | 0.94 | 0.54 | 0.54 |
| Added water | 0.16 | 0.16 | 0.16 | 0.14 | 0.14 | 0.14 |
| N-pentane | 4.00 | 4.00 | 4.00 | 3.36 | 3.36 | 3.36 |
| Isopentane | 4.00 | 4.00 | 4.00 | 3.36 | 3.36 | 3.36 |
| RUBINATE ® 1850 isocyanate | 59.57 | 48.85 | 59.57 | 47.42 | 59.50 | 59.50 |
| Calculated Parameters | | | | | | |
| Index | 280 | 195 | 268 | 110 | 302 | 303 |
| milimoles of first catalyst | 4.10 | 4.10 | 4.11 | 1.18 | 4.07 | 4.08 |
| millimoles of second catalyst | 1.20 | 1.20 | 1.21 | 19.67 | 5.39 | 7.29 |
| Molar ratio of first to second catalyst | 3.42 | 3.42 | 3.39 | 0.06 | 0.76 | 0.56 |
| Foam reactivity | | | | | | |
| Gel time, seconds | 20 | 22 | 24 | 25 | 12 | 11 |
| Tack free time, seconds | 29 | 29 | 36 | 29 | 24 | 19 |
| Foam Properties | | | | | | |
| Foam density, pcf | 1.66 | 1.77 | 1.52 | 2.21 | 2.04 | 1.87 |

TABLE 4-continued

| | Type | | | | | |
|---|---|---|---|---|---|---|
| | Comp | Comp | Comp | Comp | Ex | Ex |
| | | | Foam # | | | |
| | 17 | 18 | 19 | 20 | 21 | 22 |
| k-factor, BTU · in/ft² · hr · °F. | | | | | | |
| at 75° F. mean temperature | 0.150 | 0.148 | 0.154 | 0.157 | 0.146 | 0.154 |
| at 25° F. mean temperature | 0.182 | 0.181 | 0.181 | 0.147 | 0.145 | 0.150 |
| Ratio of k-factor at 75° F. to 25° F. | 0.82 | 0.82 | 0.85 | 1.07 | 1.01 | 1.03 |
| PIR/PUR ratio | — | — | — | 0.37 | 2.18 | 2.33 |

Example 5

Additional rigid polyisocyanurate foams were prepared using the formulations set forth in Table 5 following the process outlined in Example 1. Foam formulations in Table 5 use polyester polyols with a higher hydroxyl value. The data in Table 5 also indicate that a low molar ratio of first to second catalyst results in foam with good insulation performance at either 75° F. or at 25° F. average temperature, irrespective of the other parameters of the formulation, such as change in fire retardant package or the non-reactive tertiary amine.

Example 6

Additional rigid polyisocyanurate foams were prepared using the formulations set forth in Table 6 following the process outlined in Example 1. Foams 29, 30, and 31 are comparative examples made using reactive tertiary amines rather than the non-reactive tertiary amines disclosed herein. The data in Table 6 indicate that use of reactive tertiary amines does not yield the improved ratio of k-factor at 75° F. to that at 25° F. achieved using non-reactive tertiary amines.

TABLE 5

| | Type | | | | | |
|---|---|---|---|---|---|---|
| | Comp | Ex | Ex | Ex | Ex | Ex |
| | | | Foam # | | | |
| | 23 | 24 | 25 | 26 | 27 | 28 |
| Formulation | | | | | | |
| ISOEXTER ® 3061-US | 25.66 | 31.24 | 29.53 | 26.57 | — | 25.11 |
| STEPANPOL ® PS-3152 | — | — | — | — | 30.80 | — |
| TCPP | 4.23 | — | — | — | — | 3.00 |
| TEP | — | — | — | 2.98 | — | — |
| SAYTEX ® RB79 | — | — | 1.50 | 1.49 | — | — |
| PEL-CAT ® 9540-A | 1.50 | 1.07 | 1.08 | 1.06 | 1.50 | 0.80 |
| JEFFCAT ® PMDETA catalyst | 0.30 | 0.21 | 0.22 | 0.21 | 0.15 | — |
| JEFFCAT ® DMCHA catalyst | — | 0.53 | 0.43 | 0.43 | 0.60 | — |
| JEFFCAT ® BDMA | — | — | — | — | — | 4.00 |
| VORASURF ® 504 | 0.56 | 0.56 | 0.56 | 0.57 | 0.56 | 0.56 |
| Added water | 0.16 | 0.14 | 0.14 | 0.14 | 0.14 | 0.09 |
| N-pentane | 4.00 | 3.35 | 3.49 | 3.49 | 3.34 | 3.43 |
| Isopentane | 4.00 | 3.35 | 3.49 | 3.49 | 3.34 | 3.43 |
| RUBINATE ® 1850 isocyanate | 59.56 | 59.56 | 59.56 | 59.56 | 59.56 | 59.56 |
| Calculated Parameters | | | | | | |
| Index | 245 | 214 | 218 | 246 | 211 | 271 |
| milimoles of first catalyst | 5.77 | 4.12 | 4.15 | 4.09 | 5.78 | 3.08 |
| millimoles of second catalyst | 1.74 | 5.41 | 4.64 | 4.58 | 5.60 | 29.68 |
| Molar ratio of first to second catalyst | 3.33 | 0.76 | 0.89 | 0.89 | 1.03 | 0.10 |
| Foam reactivity | | | | | | |
| Gel time, seconds | 20 | 14 | 14 | 14 | 12 | 14 |
| Tack free time, seconds | 27 | 18 | 19 | 18 | 15 | 30 |
| Foam Properties | | | | | | |
| Foam density, pcf | 1.53 | 1.72 | 1.73 | 1.66 | 1.69 | 1.75 |
| k-factor, BTU · in/ft² · hr · °F. | | | | | | |
| at 75° F. mean temperature | 0.158 | 0.153 | 0.151 | 0.152 | 0.149 | 0.155 |
| at 25° F. mean temperature | 0.175 | 0.144 | 0.142 | 0.147 | 0.139 | 0.144 |
| Ratio of k-factor at 75° F. to 25° F. | 0.90 | 1.06 | 1.06 | 1.03 | 1.07 | 1.08 |

TABLE 6

| | Type | | |
|---|---|---|---|
| | Comp Foam # 29 | Comp Foam # 30 | Comp Foam # 31 |
| Formulation | | | |
| STEPANPOL ® PS-3152 | 29.50 | 29.16 | 29.50 |
| PEL-CAT ® 9540-A | 0.70 | 0.70 | 0.70 |
| JEFFCAT ® DMEA catalyst | 0.84 | — | — |
| JEFFCAT ® DPA catalyst | — | 1.19 | — |
| JEFFCAT ® ZR-50 catalyst | — | — | 0.84 |
| VORASURF ® 504 | 0.60 | 0.60 | 0.60 |
| Added water | 0.11 | 0.11 | 0.11 |
| N-pentane | 5.77 | 4.12 | 4.12 |
| Isopentane | 2.47 | 4.12 | 4.12 |
| RUBINATE ® 1850 isocyanate | 57.00 | 57.00 | 57.00 |
| Calculated Parameters | | | |
| Index | 274 | 274 | 292 |
| milimoles of first catalyst | 2.69 | 2.69 | 2.69 |
| millimoles of second catalyst | 9.44 | 5.46 | 3.44 |
| Molar ratio of first to second catalyst | 0.29 | 0.49 | 0.78 |
| Foam reactivity | | | |
| Gel time, seconds | 18 | 19 | 16 |
| Tack free time, seconds | 35 | 26 | 21 |
| Foam Properties | | | |
| Foam density, pcf | 1.58 | 1.72 | 1.79 |
| k-factor, BTU · in/ft$^2$ · hr · ° F. | | | |
| at 75° F. mean temperature | 0.155 | 0.16 | 0.153 |
| at 25° F. mean temperature | 0.211 | 0.19 | 0.181 |
| Ratio of k-factor at 75° F. to 25° F. | 0.73 | 0.84 | 0.85 |

The substantial improvements in low temperature insulation performance of foams used in building construction are surprising and unexpected especially as all other desired performance attributes, such as excellent flammability and structural integrity are retained. The examples suggest that the solution proposed herein is robust and insensitive to application-specific changes in other aspects of the formulation, such as fire retardant, polyol, and/or surfactant.

While the foregoing is directed to embodiments of the present invention, other and further embodiments of the invention may be devised without departing from the basic scope thereof, and the scope thereof is determined by the claims that follow.

The invention claimed is:

1. A method of forming an insulating member, comprising:
   forming a composition, comprising:
      an organic polyisocyanate;
      at least about 20% by weight of an aromatic polyester polyol based on the total weight of the composition;
      a hydrocarbon blowing agent;
      a first catalyst comprising a salt selected from the group consisting of a carboxylate salt of an alkali metal, a carboxylate salt of an alkaline earth metal, a carboxylate salt of a quaternary ammonium, and combinations thereof;
      a tertiary amine selected from the group consisting of a trialkylamine, an alkyl amine, an alkylaryl amine, an aliphatic polyamine, diazabicyclooctane, 1,4-ethylene piperidine, N-methylimidazole, 1,2-dimethylimidazole, 1,8-diazabicyclo(5,4,0)undecene-7, an ether amine, a saturated heterocyclic amine, and a combination thereof;
      wherein a molar ratio of the first catalyst to the tertiary amine is less than about 1.0, wherein the tertiary amine is present in an amount of at least 4.0 millimoles per 100 grams of the composition to 9.46 millimoles per 100 grams of the composition, and the composition has an isocyanate index of about 200 to 500; and
   dispensing the composition onto a substantially flat moving surface.

2. The method of claim 1, wherein the first catalyst is selected from the group consisting of potassium formate, potassium acetate, potassium propionate, potassium butanoate, potassium pentanoate, potassium hexanoate, potassium neohexanoate, potassium heptanoate, potassium octoate, potassium neooctoate, potassium 2-ethylhexanoate, potassium decanoate, potassium butyrate, potassium isobutyrate, sodium octoate, lithium octoate, trimethyl(2-hydroxypropyl)ammonium formate, and trimethyl(2-hydroxypropyl) ammonium 2-ethylhexanoate.

3. The method of claim 1, wherein the organic polyisocyanate is a polymeric polymethylene polyphenylene polyisocyanate having an isocyanate functionality greater than about 2.0.

4. The method of claim 3, wherein the organic polyisocyanate has a diphenyl methane diisocyanate content between about 15% and about 42% by weight based on the total weight of the organic polyisocyanate.

5. The method claim 1, wherein the hydrocarbon blowing agent comprises a hydrocarbon selected from the group consisting of isopentane, n-pentane, and cyclopentane.

6. The method of claim 1, wherein the hydrocarbon blowing agent comprises a blend of isopentane and n-pentane in a ratio of isopentane to n-pentane between about 80:20 and 20:80 parts by weight.

7. The method of claim 1, wherein the tertiary amine is present in an amount of at least about 4.5 millimoles per 100 grams of the composition to 9.46 millimoles per 100 grams of the composition.

8. The method of claim 1, wherein the composition further comprises a polyol selected from the group consisting of a polyether polyol and an aliphatic polyester polyol, wherein the polyether polyol or the aliphatic polyester polyol has an equivalent weight between about 40 and about 4000 and a functionality of about 2 to about 8.

* * * * *